United States Patent
McKenzie

(10) Patent No.: US 9,765,889 B2
(45) Date of Patent: *Sep. 19, 2017

(54) SEAL

(71) Applicant: REDSEAL LIMTIED, Aberdeen (GB)

(72) Inventor: Martin McKenzie, Aberdeenshire (GB)

(73) Assignee: Redseal Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/816,862

(22) Filed: Aug. 3, 2015

(65) Prior Publication Data

US 2016/0102764 A1 Apr. 14, 2016

Related U.S. Application Data

(63) Continuation of application No. 13/141,128, filed as application No. PCT/GB2009/002952 on Dec. 23, 2009, now Pat. No. 9,097,348.

(30) Foreign Application Priority Data

Dec. 23, 2008 (GB) .................................. 0823444.5

(51) Int. Cl.
| | |
|---|---|
| *F16J 15/16* | (2006.01) |
| *F16J 15/3284* | (2016.01) |
| *F16J 15/40* | (2006.01) |
| *E21B 33/08* | (2006.01) |

(52) U.S. Cl.
CPC .............. *F16J 15/16* (2013.01); *E21B 33/08* (2013.01); *F16J 15/168* (2013.01); *F16J 15/3284* (2013.01); *F16J 15/40* (2013.01)

(58) Field of Classification Search
CPC .. F16J 15/38; F16J 15/40; F16J 15/403; F16J 15/168; F16J 15/3284
USPC ......... 277/542, 318, 320, 324, 329, 432, 904
See application file for complete search history.

(56) References Cited

U.S. PATENT DOCUMENTS

| | | | | |
|---|---|---|---|---|
| 3,256,005 A | * | 6/1966 | Taylor ....................... | F16F 5/00 267/292 |
| 5,173,526 A | * | 12/1992 | Vijayendran ....... | C08F 283/006 524/457 |
| 5,208,305 A | * | 5/1993 | Grootaert .................. | C08F 2/38 526/194 |
| 5,244,183 A | * | 9/1993 | Calvin ................... | F16J 15/004 137/312 |
| 5,769,427 A | * | 6/1998 | Ostrowski ............. | F04D 29/128 277/318 |
| 5,772,216 A | * | 6/1998 | Bredemeyer ......... | F16K 41/003 277/318 |
| 6,020,276 A | * | 2/2000 | Hoyes ...................... | F16J 15/22 442/185 |

(Continued)

*Primary Examiner* — Kristina Fulton
*Assistant Examiner* — L. Susmitha Koneru
(74) *Attorney, Agent, or Firm* — Blank Rome, LLP

(57) ABSTRACT

A device to provide a seal between a housing for a moving element such as a drill chain, piston or the like and the moving element. The device comprising a storage well to retain seal material, the block having an outlet connecting with an aperture in a housing enabling seal material to flow into the space between a housing and the moving element and form a seal, the device further including an inlet port enabling seal material precursor to be added into the block, and pressurising means to pressurise the seal material precursor and force it out of the aperture.

20 Claims, 6 Drawing Sheets

(56) References Cited

U.S. PATENT DOCUMENTS

2005/0230106 A1* 10/2005 Mahoney ............... E21B 33/03
166/244.1

* cited by examiner

SEAL

TECHNICAL FIELD

The present invention relates to an improved seal. The seal is particularly for use in the oil industry to provide a seal between a piston and a piston housing; or as part of a slip joint in a marine riser.

BACKGROUND ART

The requirement to provide a seal between separate elements is well known in a wide range of technical fields. Typically this is carried out to prevent passage of a fluid from one region to another, for example due to a requirement to maintain a pressure differential or to prevent the fluid from causing damage outside its use area.

Where the seal is between two articles undergoing relative motion then the problem becomes more difficult, because if the seal element is to be effective, the seal element needs to engage both articles. The motion then causes wear on the seal element. Additionally, the seal element can impart a force resistive to the motion.

In the oil industry for example different types of relative motion can be contemplated: both relating to movement of an item of equipment within a generally cylindrical casing. In the case of a casing housing for a drill, then the seal between the drill and the casing needs to be able to withstand the rotatory motion of the drill. In the case of a piston, its longitudinal motion along the axis of the piston and the piston housing causes the difficulty.

In both of these situations, too soft a seal material can result in rapid wear of the seal element. Too hard a seal material can result in a weak seal as the seal material does not engage well with the various articles. Alternatively, if the seal engages too strongly with the articles then it can inflict wear on these articles and also inhibit their motion.

Within an oil industry drilling operation it is important that an effective seal be maintained for as long a period as possible, as replacement of the seal element can be both hazardous and expensive. Moreover, some seal elements are in difficult locations many metres underground and so the replacement may not be easy. Further, some seal elements are used in locations where space is at a premium and so the horizontal area taken up by the seal element and the housing therefor should occupy as little space as possible.

In the particular examples given above, conventional seal elements are sacrificial and comprise a polymeric rubber material, often having a layer of lubricating oils between the seal material and the drill or piston. The material is often housed within a seal block affording access to replace the seal element when required. As indicated however this requires the operation being undertaken to be closed down and for the section containing the seal block to be isolated to prevent backflow from the drill hole.

It is an object of the present invention therefore to provide a seal to address the above problems. It is a further object of the present invention to provide an improved method of obtaining a seal which addresses the above problems and reduces the frequency with which downtime occurs.

SUMMARY OF INVENTION

According to a first aspect of the invention there is provided;

a device to provide a seal between a housing for a moving element such as a drill string, piston or the like, and the moving element the device comprising a storage well to retain seal material, the well having an outlet connecting with an aperture in the housing enabling seal material to flow into the space between the housing and the moving element and form a seal, an inlet port enabling seal precursor to be added into the well, pressurising means to pressurise the seal material and force it out of the aperture.

The seal can therefore be continually renewed without the requirement to shut down an operation.

Preferably, the seal precursor comprises one or more monomers, the or each monomer reacting to form a polymer. Polymeric materials can be selected to have the properties required of the seal material. Moreover, the reaction between monomers can be tailored to suite any change in seal material required.

Optionally, the seal precursor includes a chemical initiator such as free radical or free radical producer to accelerate the reaction between monomers. Again therefore, further control over the polymer material is obtained.

Alternatively or further optionally, reaction between monomers is initiated thermally.

Conveniently, the device includes temperature control means to control the temperature of the seal material.

Optionally, the seal precursor includes a particulate material distributed throughout the seal precursor distributed throughout its volume. The particulate material further optionally includes polytetrafluoroethylene or a silica glass.

The pressure exerted on the piston is advantageously provided by hydraulic pressure.

Optionally, the pressure exerted on the seal material precursor is provided by a piston operated by hydraulic pressure.

Advantageously, means are included to determine the volume of seal material in the well enabling an operator to determine when replacement seal material needs to be added.

Conveniently the piston surface in contact with the seal material is profiled to increase the surface area of the piston surface and aid mixing of and integration between seal material precursor and seal material. Further conveniently, the surface is serrated.

Preferably a pressure indicator is included to determine the pressure in the well.

The device preferably includes a level indicator to show the level of seal material in the well. The indicator is further preferably a rod whose lower end rests on the surface of the seal material, the rod passing through the housing.

According to a second aspect of the invention there is provided a method of producing a seal, the method comprising the steps of:

(i) mounting a seal forming device to a casing, the device including a housing enclosing a portion of a reciprocating or rotating article with which a seal is to be made with the housing, (ii) the device having a storage well to retain a seal material, a closeable communicating aperture connecting the storage well with the external surface of an article, an inlet enabling seal material precursor to be introduced into the well, and pressurising means to apply pressure to the seal material;

(iii) introducing flowable seal material precursor into the storage well, (iv) allowing the seal precursor to set into seal material, (v) applying pressure via the pressurising means to force the seal material through the aperture into the open volume between the housing and an article to seal the space between the housing and an article, (vi) introducing further seal material precursor to retain seal material in the storage well.

BRIEF DESCRIPTION OF DRAWINGS

The invention will now be described with reference to the accompanying drawings which show by way of example only, two examples of a seal. In the drawings.

DESCRIPTION OF EMBODIMENTS

The requirement to form a seal between two elements of a machine, to prevent fluid flow, has been known for centuries and a large variety of solutions proposed. The most common of these solutions involves simply interposing a fluid impermeable barrier, which barrier conforms to the shape of each element and so does not allow fluid across.

Such an arrangement is usually successfully and readily achieved where the two elements are stationary relative to one another. However, where the two elements are in relative motion, then difficulties occur. Such a situation can occur where for example, one of the elements is a piston moving in a cylinder or a drill shaft rotating within a guide housing. Due to the seal element being in close contact with the moving element, wear on the seal element can be rapid. The seal will therefore need to be replaced at frequent intervals to prevent leakage of fluid and also damage to the elements. Replacement can be expensive: partially due to the cost of the seals themselves, but also in terms of the loss of production time due to the machine being switched off. Moreover, especially in the oil industry many seals are not easily accessible and working on their replacement can be dangerous. In addition seals are in locations, such as an offshore drilling rig, where the space occupied by the seal and its housing needs to be kept to a minimum.

The present invention seeks to prolong the lifetime of a seal by providing a seal which is in effect continually being renewed. This is achieved by feeding through, under pressure, the seal material so that as the leading edge of the seal material is worn away, the material behind the leading edge takes its place in contact with the moving element. In addition replacement seal material is added to the volume of seal material, remote from the seal/element interface, to ensure that the seal does not completely wear away. Such replacement material can be added without the drilling operation ceasing or, where safety considerations render this impracticable, with a minimum downtime to the production or manufacturing process.

Figure 1:
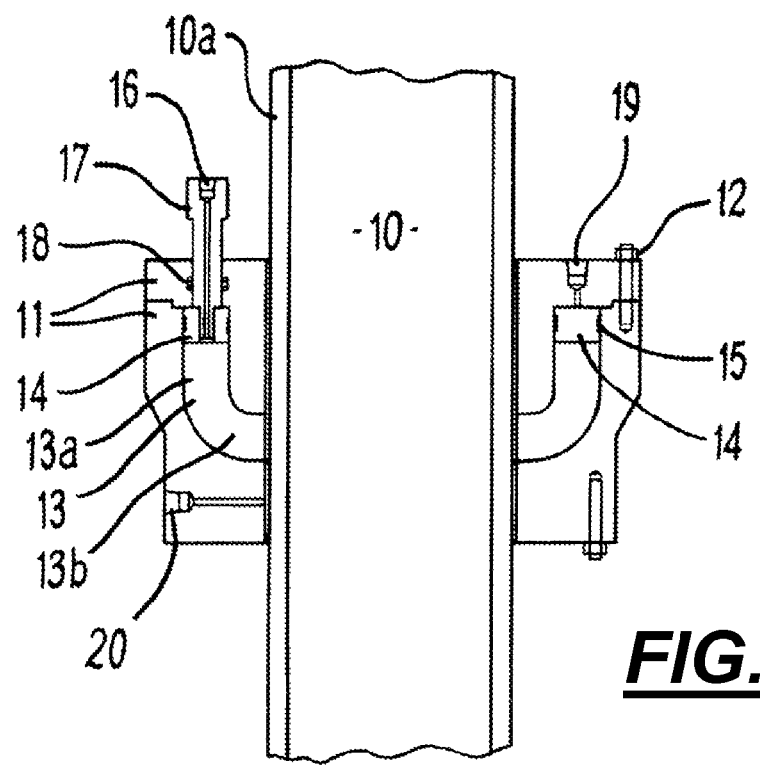
FIG. 1 is a cut away side view of a sealing block and cylinder.
Figure 2:
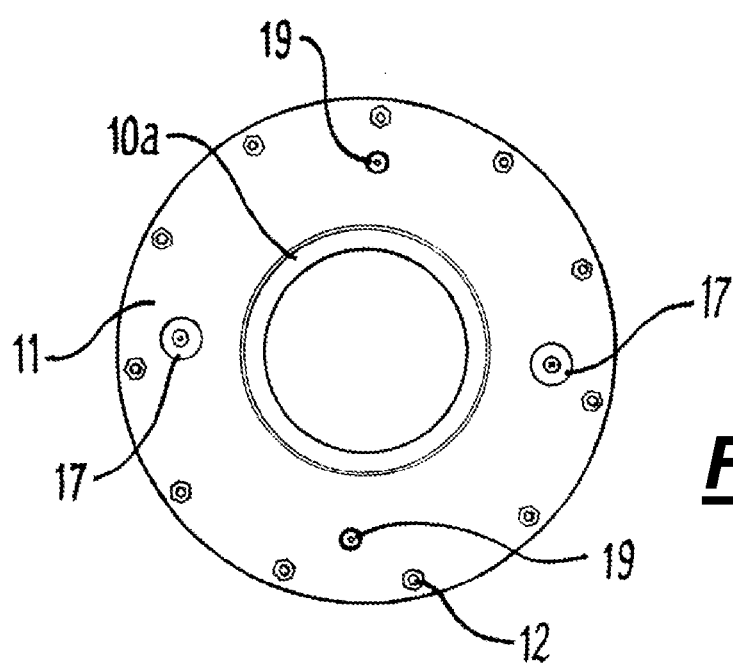
FIG. 2 is a top view of a block.

With reference therefore to FIGS. 1 & 2 the basic elements of the seal are shown. The problem as shown here is to provide a seal about the outside of the reciprocating barrel 10. The barrel 10 can be a piston moved, either by chemical or mechanical energy (such as motion induced by the waves at sea), in a direction longitudinal to the axis of the barrel 10.

The seal material is a solid, resilient material and is retained within a housing 11 made of steel or other suitably strong and corrosion resistant material. To facilitate cleaning of the inner areas of the housing 11, the housing is provided in two sections, held together by housing bolts 12. The housing 11 defines a gel seal cavity 13 in which the seal material is retained. The gel seal cavity 13 defines a first portion 13a which is vertically arrayed and linked via a connection portion to a second, longitudinally orientated portion 13b. Said horizontally orientated portion 13b opens onto the barrel 10 which therefore enables the seal material within the cavity 13 to engage the barrel 10.

In use, pressure is applied to the seal material which forces the seal against the outside of the barrel wall 10a of the barrel 10. In the embodiments, illustrated herein pressure is applied by means of a piston 14, which is urged against the upper surface of the seal material. To ensure that seal material does not escape around the sides of the piston 14, piston seals 15 are housed around the piston 14. It will be readily envisaged that as the piston 14 is designed to pass around the barrel 10 the piston 14 has an annular form.

At various locations around the piston 14, means are provided in the form of a through-piston port 16 to enable fresh seal material to be passed into the gel seal cavity 13. In the embodiment shown this facility is located within a position indicator rod 17. The rod 17 rises and falls in response to the level of seal material in the cavity 13. A further seal 18 ensures that material within the cavity 13 does not leak out.

Pressure can be exerted on the pistons 14 by the conventional means known in the art. For example hydraulic or pneumatic pressure can be applied via the pressure ports 19. A test or cavity pressure port 20 is provided to indicate to the user the pressure in the seal region.

The invention described herein is intended for use in conjunction with a seal material which is supplied as a monomeric or partially-polymerised pre-polymer in the form of a freely flowing liquid which can readily flow down the through-piston port 16, but which polymerises within the gel cavity 13 to form a solid polymeric material.

The pre-polymer can therefore comprise one or more monomers, together with a polymerisation initiator. Alternatively, the monomers can undergo thermal polymerisation, the housing being equipped in that case with a heating element to ensure that the correct temperature is maintained in the cavity to control the polymerisation rate to that which yields the polymer having the correct properties.

One of a polymeric material suitable for use are compounds belonging to the polysilicone family. Such materials have a general formula:

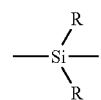

where R is an alkyl group, linear or branched. The catalyst is of a type known in the art and can comprise, —for example, a metal or polymetallic complex having organic ligands. The seal material contemplated can have a Shore Hardness of around 70.

In addition to the polymeric material a particulate solid can be included to provide a lubricator means which assists in reducing friction between the seal material and the barrel 10 said beads can be a low friction material such as polytetrafluoroethylene (PTFE). Additionally or alternatively an abrasive material can be used either as a replacement for or in addition to the lubricating material. An abrasive material can strip the rust or other irregularities from the surface of the barrel 10. It can be envisaged that the seal material include regions or slices containing abrasive material to enable periodic cleaning of the barrel 10 to be carried out.

Figure 3:
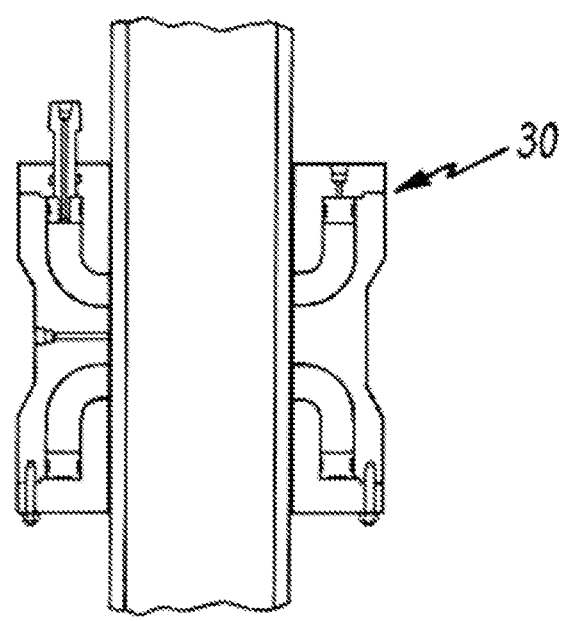
FIG. 3 is a cut away side view of a double seal assembly.

FIG. 3 is a second embodiment of a seal, functioning in the same fashion as the embodiment in FIG. 1, the second embodiment of housing 30 providing however a double seal, each of which is produced as outlined above.

Figure 4A:
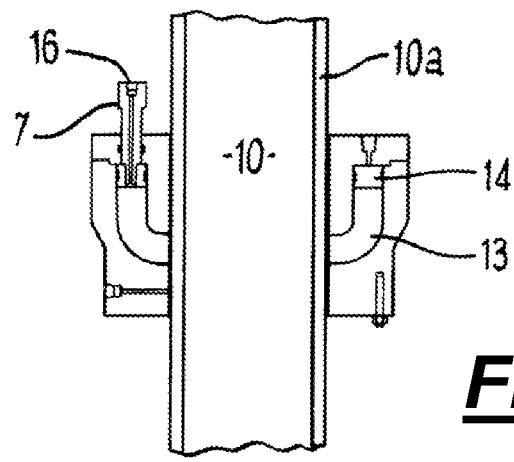
FIGS. 4a, b, & c illustrate the operation of the sealing block of FIG. 1.
Figure 4B:
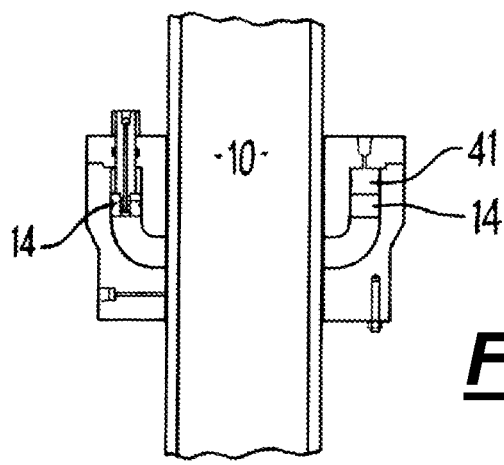
Figure 4C:
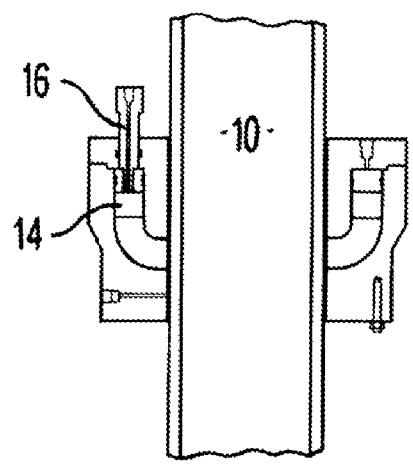

The process by which a seal is formed and maintained is shown in FIGS. 4a-4c. In these figures, those parts referred to, which are shown in FIG. 1 are shown with the same reference numbers.

Figure 5:
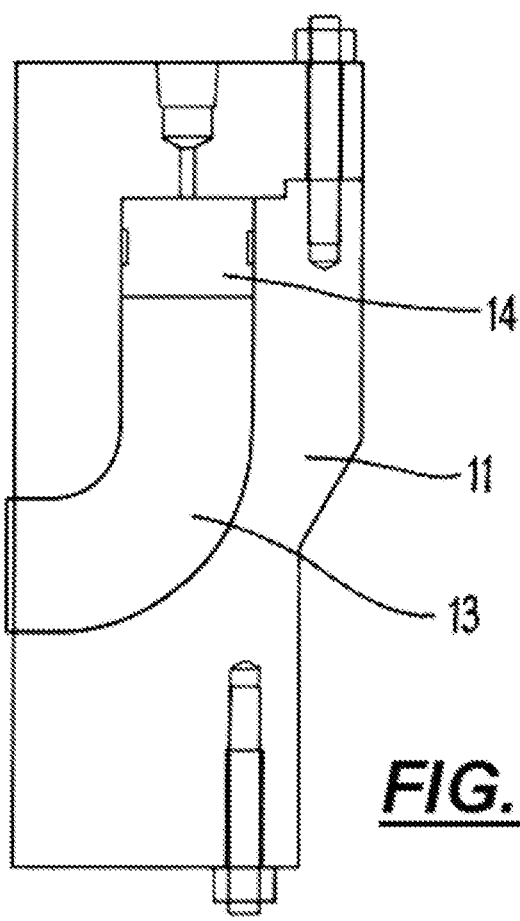
FIG. 5 illustrates the sealant retainer in a block.

In FIG. 4a, the seal material is shown, in solidified form, filling the cavity 13 (this is shown in more detail in FIG. 5). Pressure is exerted on the seal material via the piston pressure ports 19. Pressure is typically exerted by a hydraulic fluid. The fluid acts to push the piston 14 onto the seal material and cause the plug of seal material to be pushed out of the aperture (not shown) until the material is against the barrel 10 in sufficient amount and with sufficient pressure to cause a seal to be formed. It will be recognised that the solidified seal material should possess sufficient elasticity to enable the seal material to form into the shape of the barrel wall 10a.

The piston position indicator 17 at this point is at its maximum extension out of the housing 11 indicating the cavity 13 is full. As the seal material wears away due to the motion of the barrel 10, and referring now to FIG. 4b, the pressure maintained on the seal material forces the plug of seal material along the cavity 13. The piston 14 therefore is moved along the cavity 13, the hydraulic fluid moving into the volume 41 formerly occupied by the piston 13 to maintain the pressure on the piston. As the level of seal material drops this is indicated by the position indicator 17.

Once the level of seal material drops below a preset level, un-reacted pre-polymer is added along through the gel injection port 16 to bring the level in the cavity 13 back up to the full mark. The pre-polymer polymerises within the cavity 13 and in sufficient time for it to be solid before it reaches the aperture to the barrel 10.

In the above manner a seal is continually maintained and renewed without the need for the action of the barrel 10 to be stopped. Downtime of the machine or process, of which the barrel 10 is a part, is therefore considerably reduced.

Operation of the device to introduce pre-polymer into the cavity 13 when the level of the piston 14 drops, can be done either manually or automatically. For example, when the indicator rod 17 drops to a preset level this can be set up to cause a warning signal to be given off. An operator then adds pre-polymer to the cavity 13. The pre-polymer is added under sufficient pressure to force the piston '14 upwards, and addition is continued until the level in the cavity 13 is at the required level.

Alternatively, the drop in the indicator rod 17 can be configured to trigger automatic filling of the cavity 13 with pre-polymer.

In order to increase the mixing and integration of introduced pre-polymer into the solid material of the set polymeric seal material, the lower edge of the piston which engages the seal material, can be profiled.

Figure 6:
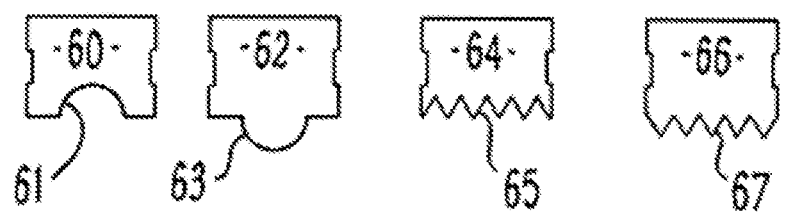
FIG. 6 illustrates piston profiles.

As illustrated in FIG. 6, a number of different profiles can be used In FIG. 6a, the lower surface 61 of the piston 60 is concave, causing a discontinuity in the surface of the seal material which enables better bonding. Similarly, the surface 63 of the piston 62 in FIG. 6b produces an indentation in the surface of the material.

The surfaces 65, 67 of pistons 64, 66 respectively are serrated, which serrations provide sharp discontinuities and possibly score marks in the seal material which enable the pre-polymer to penetrate the bulk of the seal material and so minimise the discontinuity between the newly introduced seal material and the already present material once the new pre-polymer has set.

Figure 7A:
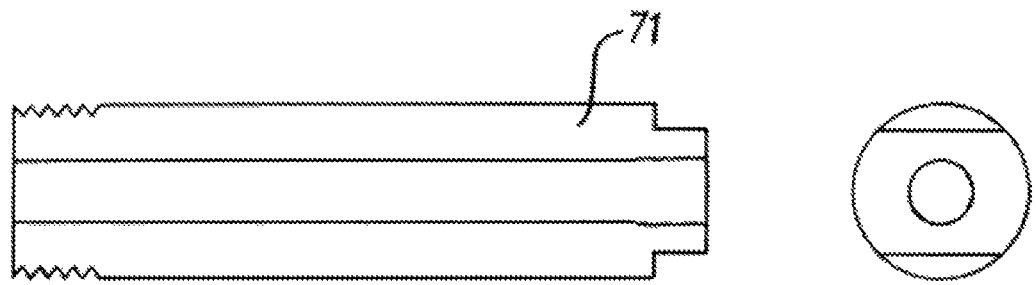
FIGS. 7a-7c illustrate an embodiment of an indicator rod.
Figure 7B:
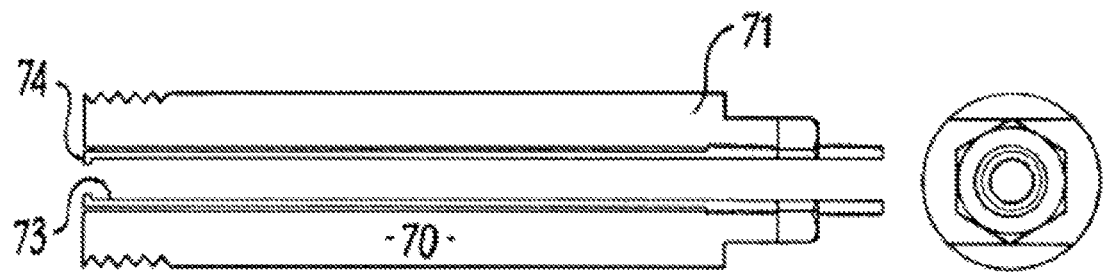
Figure 7C:
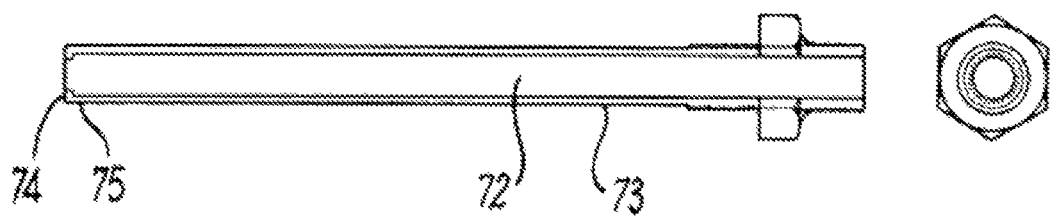

In an additional embodiment, an indicator rod (see FIGS. 7a-7c) is removable which particularly facilitates the cleaning out of excess seal material which has hardened within the indicator rod during the introduction of fresh liquid seal precursor. The indicator rod is formed of two main elements, an outer jacket 71 and a removable tubular lining insert 72. The tubular part 73 of the insert 72 is passed down the central channel of the outer jacket 71 and the insert 72 are retained together by means of a screw threaded fitment, at the proximal end of the rod. The outer surface of the outer jacket 71 has a screw thread at its distal end to allow the rod 70 to be fitted in position.

The above arrangement enables the insert 72, once the sealant material has set, to be removed. The removal is facilitated by the narrowing 74 of the insert 72 at its distal end 75. The narrowing results in the sealant material at that point being weaker, and the twisting action moreover, as the insert 72 is unscrewed causes the sealant material to break away allowing the resultant apertures to be capped off. Alternatively, the insert 72, once cleaned can be replaced and its end capped off.

Figure 8:
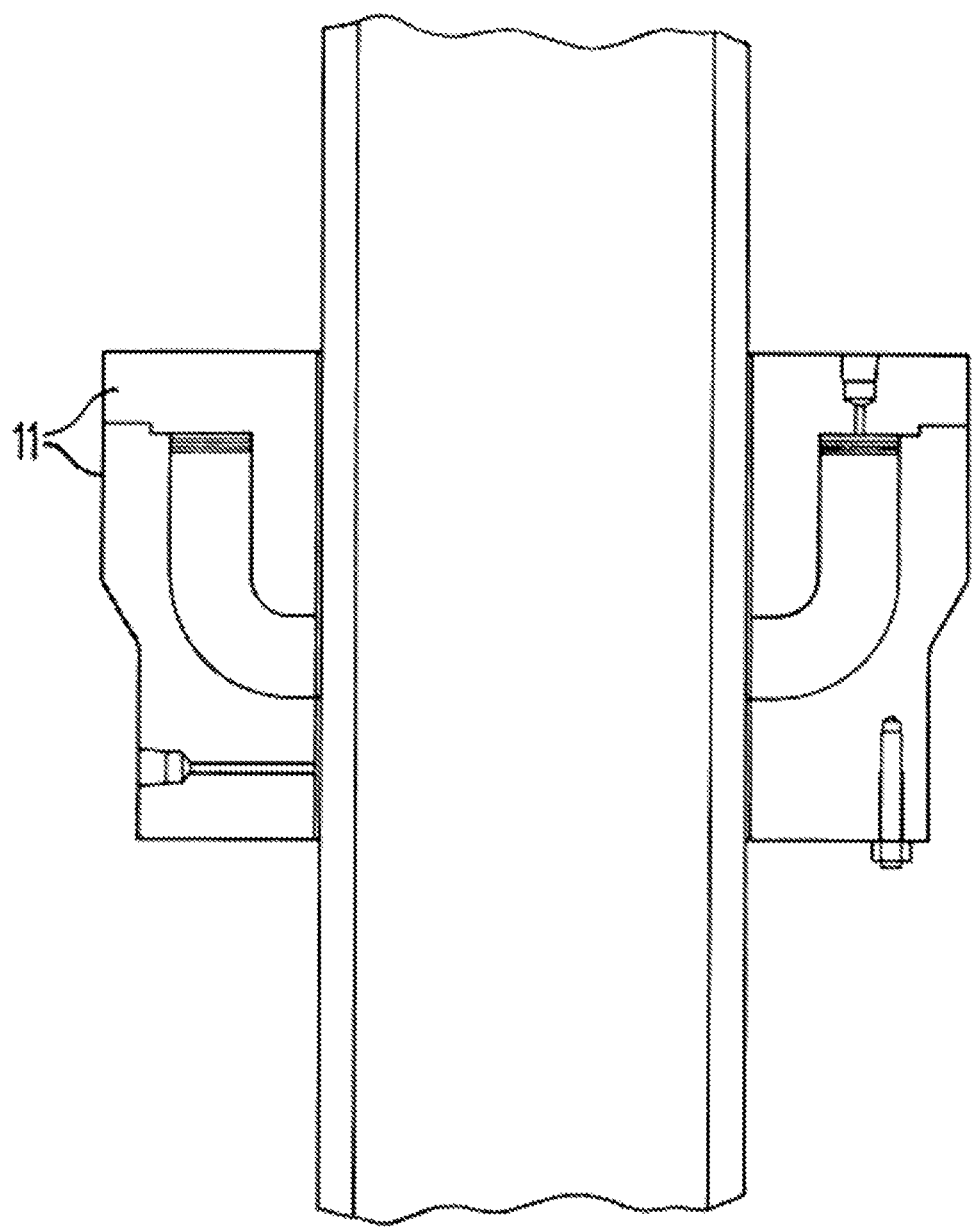
FIG. 8 illustrates a housing usable in an embodiment of a seal.

A further means of utilising the housing is shown in FIG. 8. In this mode, there is no indicator rod or means of topping up the sealant material. The seal element is provided as a preformed ring which is inserted into the block 11. The preformed element can include a seal arrangement moulded or fitted to its top edge which prevents hydraulic pressurising fluid from penetrating between the element and the housing. Means are provided to apply pressure to the seal element to fuse it against the original seal already contained within the block 11.

In addition to the above embodiment of FIG. 8 means can also be provided to bond or join together the original seal element and the newly inserted element. Said means can be in the form of an adhesive material or a portion of primer which can partially solubilise the surfaces of the elements, subsequently binding together when the premix sets.

It will of course be understood that the invention is not limited to the specific details described herein, which are given by way of example only, and that various modifications and alterations are possible within the scope of the invention.

I claim:

1. A device to provide a seal between a housing for a moving element and the moving element, the device comprising:
   a storage well;
   a solid seal material in the storage well extending through an opening of the storage well and into contact with the moving element at a seal interface in use;
   pressurising means configured to pressurize the solid seal material in the storage well and force the solid seal material out of the opening and into contact with the moving element to form a seal in use; and an inlet port to the storage well, the inlet port configured to enable a flowable seal material precursor to be introduced into the storage well between the pressurizing means and the solid seal material.

2. A device according to claim 1, wherein the seal material precursor comprises one or more pre-polymers, the or each pre-polymer reacting in the device to form a polymer.

3. A device according to claim 2, wherein the seal material precursor comprises one or more monomers, and the reaction between monomers is initiated thermally.

4. A device according to claim 1, wherein the seal material precursor comprises one or more monomers, and includes a chemical initiator to accelerate a reaction between monomers.

5. A device according to claim 1, further comprising a temperature control means to control the temperature of the seal material.

6. A device according to claim 1, wherein the seal material precursor includes a particulate material distributed throughout its volume.

7. A device according to claim 6, wherein the particulate material is selected from polytetrafluoroethylene or a silica glass.

8. A device according to claim 1, wherein the pressurising means comprises a piston operated by hydraulic or pneumatic pressure.

9. A device according to claim 8, wherein the piston comprises a profiled piston surface in contact with the seal material or seal material precursor.

10. A device according to claim 9, wherein the piston surface is serrated.

11. A device according to claim 1, further comprising a pressure indicator for determining the pressure in the storage well.

12. A device according to claim 1, further comprising a level indicator to determine a level of seal material within the storage well.

13. A device according to claim 12, wherein the level indicator is a rod, comprising a lower end resting on a surface of the seal material in the storage well, and the rod passes through the housing to display the level of seal material in the storage well.

14. A method of producing a seal around a moving element, the method comprising:
    providing a device according claim 1, the device enclosing a portion of the moving element; and
    applying pressure via the pressurizing means to force the solid seal material in the storage well out of the opening and into contact with the moving element to form the seal.

15. A method of replenishing a seal between a housing for a moving element and the moving element, the method comprising:
    providing a seal forming device, the device including a housing enclosing a portion of the moving element with which a seal is to be made with the housing, wherein the device comprises:
        a storage well to retain a seal material, the storage well having an opening to a surface of the moving element;
        a solid seal material in the storage well, the solid seal material extending through the opening of the storage well and into contact with the moving element at a seal interface;
        pressurizing means; and
        an inlet port to the storage well;
    introducing a flowable seal material precursor into the storage well through the inlet port; and
    setting the flowable seal material precursor into a solid in the storage well to replenish the solid seal material.

16. The method as claimed in claim 15 wherein the seal material precursor comprises one or more pre-polymers, and the method comprises reacting the or each pre-polymer in the device to form a polymer.

17. The method as claimed in claim 15 comprising controlling a temperature of the seal material using a temperature control means of the device.

18. A device to provide a seal between a housing for a moving element and the moving element, the device comprising:
    a storage well to retain a seal material, the storage well having an aperture in a housing connecting the storage well with an external surface of the moving element and enabling the seal material to pass into a space between a housing and the moving element; and
    pressurising means to pressurise the seal material and force the seal material out of the aperture and into contact with the moving element to form a seal,
    wherein the seal material comprises a solid resilient seal material, wherein the device is configured to enable additional seal material to be introduced into the storage well between the pressurising means and the solid resilient seal material to replenish the solid resilient seal material, and
    wherein the pressurising means is configured to pressurise the additional seal material against the solid resilient seal material.

19. A device according to claim 18, wherein the device is configured to receive a flowable seal material precursor between the pressurising means and the solid resilient seal material to replenish the solid resilient seal material.

20. A device according to claim 19, wherein the device is configured to enable the flowable seal material precursor to set in the device.

* * * * *